United States Patent [19]

Stravitz

[11] Patent Number: 5,035,332
[45] Date of Patent: Jul. 30, 1991

[54] COLLAPSIBLE RACK FOR BOOKS, TAPES, COMPACT DISCS AND THE LIKE

[76] Inventor: David M. Stravitz, 16 Park Ave., Ste. 14A, New York, N.Y. 10016

[21] Appl. No.: 452,124

[22] Filed: Dec. 15, 1989

Related U.S. Application Data

[63] Continuation-in-part of Ser. No. 307,590, Feb. 7, 1989.

[51] Int. Cl.$^5$ .............................................. A47B 63/00
[52] U.S. Cl. ..................................... 211/40; 211/189; 211/184; 312/10
[58] Field of Search ...................... 211/40, 41, 42, 43, 211/189, 184; 403/348, 349, 252, 254, 263; 24/590, 453; 312/211, 9, 10; 248/222.3

[56] References Cited

U.S. PATENT DOCUMENTS

| | | | |
|---|---|---|---|
| 757,712 | 4/1904 | Arnold | 24/590 X |
| 3,179,367 | 4/1965 | Rapata | 248/222.3 X |
| 3,600,735 | 8/1971 | Jerabek | 403/348 X |
| 4,162,013 | 7/1979 | Tucker | 211/43 |

FOREIGN PATENT DOCUMENTS

| | | | |
|---|---|---|---|
| 1274556 | 9/1961 | France | 211/43 |
| 261537 | 11/1926 | United Kingdom | 211/43 |
| 627398 | 8/1949 | United Kingdom | 211/43 |

Primary Examiner—Reinaldo P. Machado
Assistant Examiner—Sarah A. Lechok
Attorney, Agent, or Firm—Frishauf, Holtz, Goodman & Woodward

[57] ABSTRACT

A collapsible rack for holding books, tapes, compact discs and the like, includes a first end panel having at least two sockets formed therein; a second end panel having at least two sockets formed therein; each socket including an aperture and a slot in communication with the aperture; at least two cross members extending between the end panels and securing the end panels together; each of the cross members having a first end extending through an aperture of the first end panel and a second end extending through an aperture of the second end panel; each end of each cross member having a securing tab for insertion through one slot when the end is inserted through the aperture in communication with the slot, and stops for limiting the extent of travel of the securing tab through the slot; and a portion of each end panel surrounding each aperture having a predetermined thickness such that rotation of any cross member in one the aperture, once the securing tab at one end of the cross member has been inserted through the slot in communication with the aperture, results in releasably locking the end of the cross member to the end panel with a tightening fit.

26 Claims, 3 Drawing Sheets

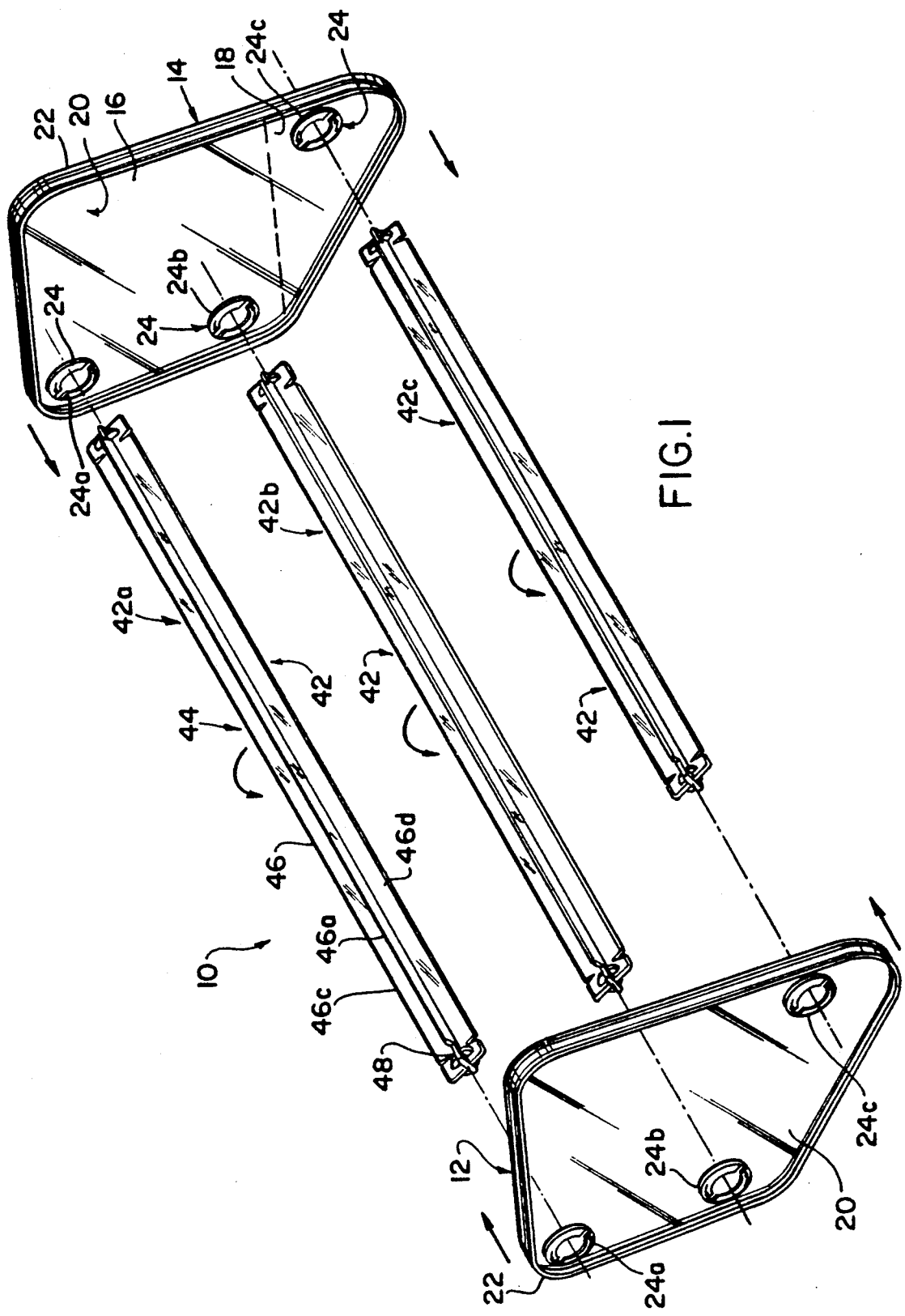

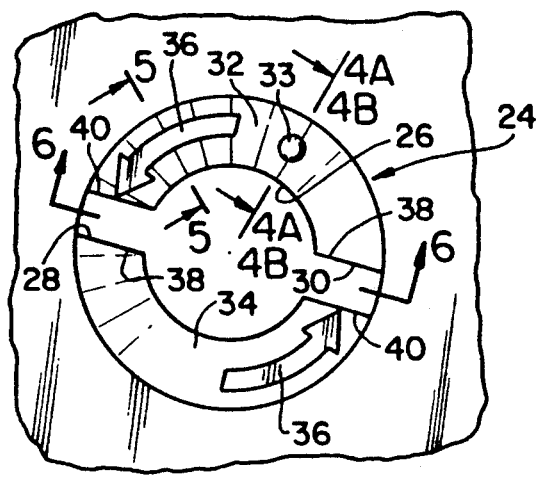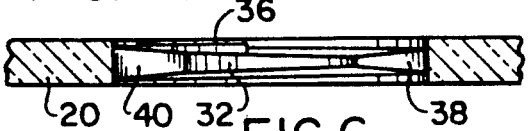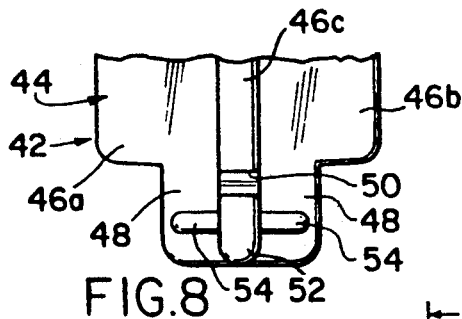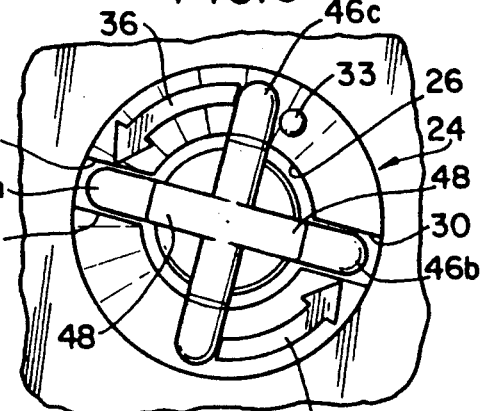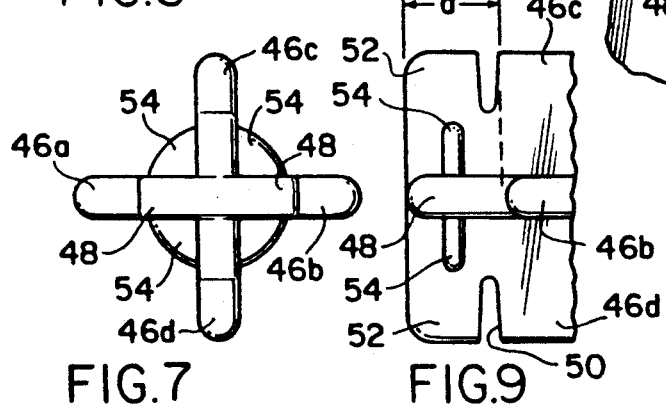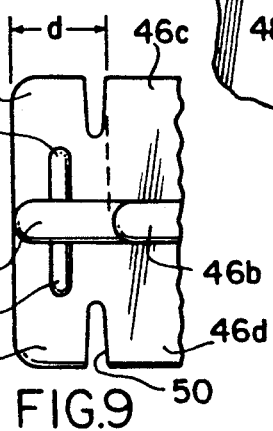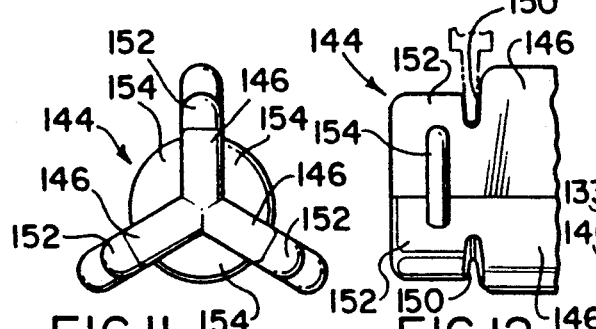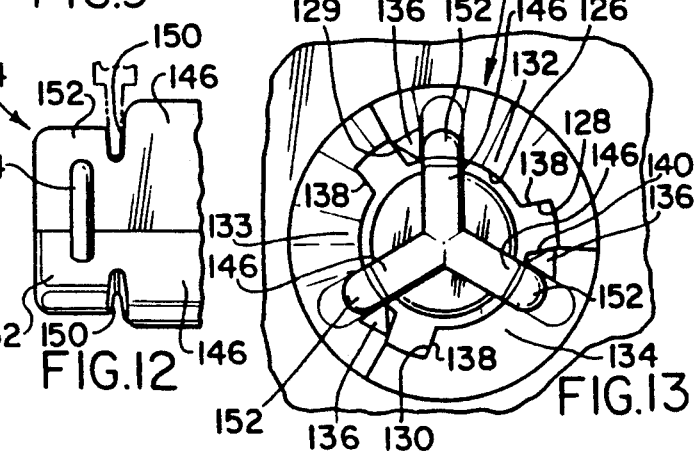

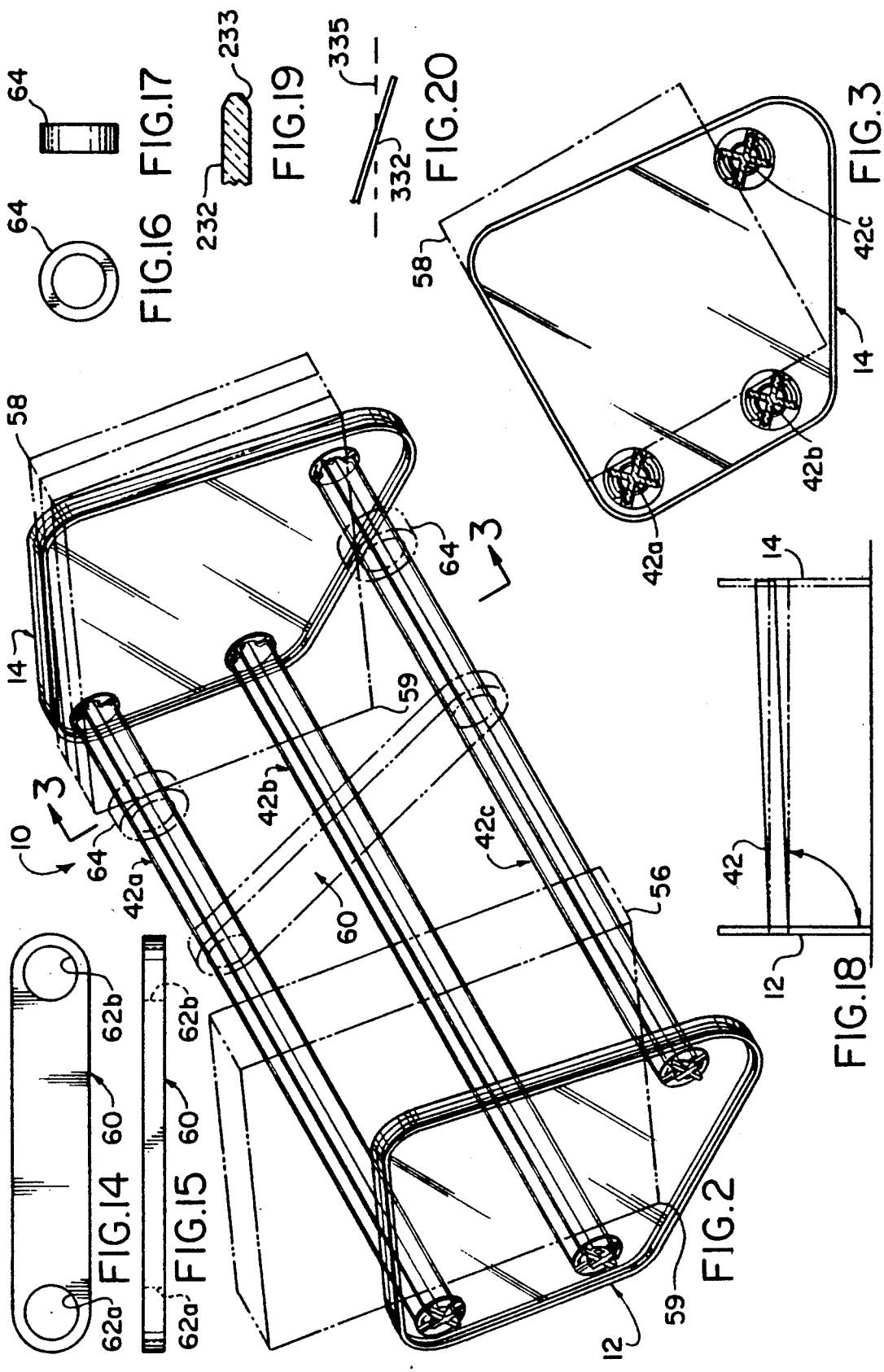

COLLAPSIBLE RACK FOR BOOKS, TAPES, COMPACT DISCS AND THE LIKE

CROSS REFERENCE TO RELATED APPLICATION

This is a continuation-in-part of my application Ser. No. 07/307,590, filed Feb. 7, 1989.

BACKGROUND OF THE INVENTION

This invention relates generally to rack structures, and more particularly, is directed to a collapsible rack for holding books, video tapes, audio tapes, compact discs and the like.

Conventionally, portable book racks and the like are permanently assembled together by adhesives, screws, nails or the like. Although such racks are sturdy, they are relatively bulky to ship, store and for display purposes.

Collapsible and portable book racks are known which generally comprise end panels and detachable cross members. However, the cross members are generally secured in the end panels with a friction-type fit which is unsatisfactory. As a result, such racks are not sufficiently sturdy in operation, particularly when heavy books and the like are placed thereon. Other collapsible and portable racks must be assembled with adhesives, screws, nails and the like, which increases the number of components and the resultant costs, increases assembly time, and makes them too complicated to be assembled by the end user.

OBJECTS OF THE INVENTION

It is an object of the present invention to provide a collapsible and portable rack that overcomes the aforementioned problems with the prior art.

It is another object of the present invention to provide a collapsible and portable rack for books, video tapes, compact discs and the like which can be shipped, stored and sold in knocked-down form.

It is still another object of the present invention to provide such a collapsible and portable rack that is extremely sturdy and durable in operation.

It is yet another object of the present invention to provide such a collapsible and portable rack in which the cross members fit within sockets in the end panels in a tightening manner upon rotation thereof.

It is still also another object of the present invention to provide such a collapsible and portable rack in which the component parts thereof can be molded from plastics materials, thus lowering the cost thereof.

The above and other objects, features and advantages of the present invention will become readily apparent from the following detailed description which is to be read in connection with the accompanying drawings.

SUMMARY OF THE INVENTION

In accordance with an aspect of the present invention, a collapsible rack for holding books, tapes, compact discs and the like, includes a first end panel having at least two sockets formed therein; a second end panel having at least two sockets formed therein; each socket including an aperture and a slot in communication with the aperture; at least two cross members extending between the end panels and securing the end panels together; each of the cross members having a first end extending through an aperture of the first end panel and a second end extending through an aperture of the second end panel; each end of each cross member having a securing tab for insertion through one slot when the end is inserted through the aperture in communication with the slot, and means for limiting the extent of travel of the securing tab through the slot; and a portion of each end panel surrounding each aperture having a predetermined thickness such that rotation of any cross member in one the aperture, once the securing tab at one end of the cross member has been inserted through the slot in communication with the aperture, results in releasably locking the end of the cross member to the end panel with a tightening fit.

BRIEF DESCRIPTION OF THE DRAWINGS

FIG. 1 is an exploded, perspective view of a rack according to one embodiment of the present invention;

FIG. 2 is an assembled perspective view of the rack of FIG. 1;

FIG. 3 is a cross-sectional view of the rack of FIG. 2, taken along line 3—3 thereof;

FIG. 4 is an enlarged plan view of one socket in an end panel of the rack of FIG. 1;

FIGS. 4A and 4B are fragmentary sectional views of modified embodiments;

FIG. 5 is a cross-sectional view of the portion of the rack of FIG. 4, taken along line 5—5 thereof;

FIG. 6 is a cross-sectional view of the portion of the rack of FIG. 4, taken along line 6—6 thereof;

FIG. 7 is an end plan view of one cross member; FIG. 8, is a top plan view of one end of the cross member of FIG. 7;

FIG. 9 is a side elevational view of one end of the cross member of FIG. 7;

FIG. 10 is an end plan view of one end of the cross member of FIG. 7 releasably locked in a socket of an end panel;

FIG. 11 is an end plan view of a cross member according to another embodiment of the present invention;

FIG. 12 is a side elevational view of one end of the cross member of FIG. 11;

FIG. 13 is an end plan view of the cross member of FIG. 11 assembled in a socket of an end panel;

FIG. 14 is an front plan view of a retainer bar which can be used with the rack of FIG. 2;

FIG. 15 is a side elevational view of the retainer bar of FIG. 14;

FIG. 16 is a front plan view of a retainer ring which can be used with the rack of FIG. 2;

FIG. 17 is a side elevational view of the retainer ring of FIG. 16;

FIG. 18 is a schematic front elevational view showing assembly of a cross member to the end panels;

FIG. 19 is a cross-sectional view showing a portion of an of the present invention; and FIG. 20 is a cross-sectional view showing a portion of an arcuate wall of one socket according to yet another embodiment of the present invention.

DETAILED DESCRIPTION

Referring to the drawings in detail, and initially to FIG. 1 thereof, a collapsible and portable rack 10 for books, video and audio tapes, compact discs and the like (hereinafter referred to as a "rack") includes a left end panel 12 and a right end panel 14. Each end panel 12 and 14 is formed in an asymmetrical parallelogram configuration which is the combination of a substantially square portion 16 and an integrally formed triangular portion 18. Other shapes could be used, as desired. Specifically, each end panel 12 and 14 shown in the drawings is formed by a plate 20 in the aforementioned asymmetrical parallelogram configuration having a square portion 16 and a triangular portion 18, with a rim 22 extending around the periphery of plate 20 to provide structural strength (reinforcement) and a flat supporting surface therefor. As will be appreciated from the discussions which follows, that portion of rim 22 extending over the hypotenuse of triangular portion 18 of each plate 20 is intended to rest on a flat surface for supporting rack 10 in a somewhat rearwardly inclined position as shown, for example, in FIG. 3.

Each plate 20 is formed with three sockets 24. Although the illustrated embodiment of the present invention uses three sockets, it will be appreciated that this number may vary, with the provision that there are at least two sockets formed therein. Also, the locations of the sockets 24 may vary, depending upon use of the rack. Specifically, as shown in FIG. 1, two sockets 24a and 24b are formed at the rear corners of square portion 16 of each plate 20, while the third socket 24c is formed approximately midway between the corners forming the shortest edge of triangular portion 18 of plate 20. Again, it will be appreciated that the position of sockets 24 herein is a preferred orientation and the present invention is not limited thereby.

As shown best in FIGS. 4-6, each socket 24 is formed by a central aperture 26 and diametrically opposite slots 28 and 30 in communication with aperture 26 and extending radially outward therefrom a predetermined distance. Each socket 24 further includes reduced thickness arcuate walls 32 and 34 which define aperture 26 and which extend arcuately between slots 28 and 30.

It will further be appreciated that arrows 36 are integrally molded as raised surfaces on reduced thickness arcuate walls 32 and 34 and extend from a point substantially five-eighths the distance from the entrance end 38 of each arcuate wall 32 and 34 to the exit end 40 thereof.

In accordance with an important aspect of the present invention, the thickness of each arcuate wall 32 and 34 increases gradually from entrance end 38 to exit end 40 thereof. This is best shown in FIG. 6. As will be apparent from the description which follows, this varying thickness results in a tightening of cross-members which connect end panels 12 and 14 together.

Rack 10 further includes a plurality of cross members 42 corresponding in number to the number of sockets 24 in each end panel 12 and 14. In the preferred embodiment, there are thus three cross members 42 corresponding to the three sockets 24 in each end panel. As shown in FIG. 1, each cross member 42 is formed by a cruciform-shaped elongated bar 44, such that each radially extending leg 46 thereof is angularly spaced from an adjacent radially extending leg 46 by 90°. As clearly shown in FIGS. 1 and 7-9, diametrically opposite radially extending legs 46a and 46b are provided with cut-away sections 48 at the opposite ends thereof which are of a radially lesser dimension than the remainder of radially extending legs 46a and 46b. Such cut-away sections 48 extend a predetermined axial distance d from the end of each radially extending leg 46a and 46b.

The remaining diametrically opposite radially extending legs 46c and 46d are formed with notches 50 which extend radially inward for a distance approximately equal to that of cut-away sections 48 and are cut in each elongated bar 44, at positions just outwardly, in the axial direction, from the start of each cut-away section 48, as best shown in FIG. 9. As a result, each radially extending leg 46c and 46d is formed with a securing tab 52 positioned outwardly in the axial direction from notches 50. Optionally provided reinforcing arcuate sections 54 connect each securing tab 52 of each radially extending leg 46c and 46d to a cut-away section 48 of each radially extending leg 46a and 46b, each arcuate section 54 having a radial dimension substantially equal to that or slightly less than cut-away sections 48. Reinforcing arcuate sections 54 are provided to ensure sufficient rigidity at the opposite ends of elongated bars 44 in view of the cut-away sections 48 and notches 50 provided therein.

In operation, each end of a cross member 42 is positioned through a respective socket 24 such that securing tabs 52 extend through diametrically opposite slots 28 and 30 of the socket. The extent through which the end of a cross member 42 can extend through a socket 24 is limited by radially extending legs 46a and 46b abutting against reduced thickness arcuate walls 32 and 34. 15 In such position, the cross member 42 is rotated in the direction of arrows 36. In such case, reduced thickness arcuate walls 32 and 34 ride within notches 50 so as to secure cross members 42 to end panels 12 an 14. It will be appreciated, as aforementioned, that the thickness of arcuate walls 32 and 34 increases from entrance end 38 to exit end 40 thereof. Accordingly, during such rotation of cross members 42 in sockets 24, the increased thickness and sloping of arcuate walls 32 and 34 provides an increasingly tightening fit within notches 50, thereby providing a releasable friction fit between cross members 42 and end panels 12 and 14. In order to prevent over tightening and breaking of cross members 42, and particularly, securing tab 52 therefrom, the rotation of cross members 42 is limited by securing tabs 52 abutting against the rear raised edge ("stop") of arrows 36.

Optionally provided are raised bump members 33, shown by way of example in FIGS. 4, 4a and 10, over which the tabs 52 pass during assembly to "snap" over bump 33, which then serve as "stops" to prevent inadvertent disengagement. The bumps 33 can be provided on the opposite surface of wall 32, as shown by bump 33 in FIG. 4B, in which case the end of leg 46C (see FIG. 8) adjacent notch 50, will engage over bump 33'.

Accordingly, with the present invention, rack 10 is formed as shown in FIG. 2 for receiving video tapes 56, compact discs 58 or books (not shown). With such construction, the rear cross members 42a and 42b serve as resting surfaces for the rear edge of such video tapes 56, compact discs 58 or books, while cross member 42c serves to support the bottom edge of such video tapes 56, compact discs 58 or the like. In such case, the rear lower corner 59 of each video tape 56, compact disc 58 or book lies at a position below cross member 42b. Because of the parallelogram configuration of end panels 12 and 14, such video tapes 46, compact discs 58 and the like are angled slightly upwardly for easy access and viewing by a user. In addition, the dimensions of rack 10 have been designed such that the top edge of a compact disc 58 lies substantially even with the top edge of end panels 12 and 14, as best shown in FIG. 3.

In accordance with an aspect of the present invention, as shown in FIG. 2, in order to separate video tapes 56, compact discs 58 and the like, retainer bars 60 (see also FIGS. 14 and 15) can be provided. As shown, each retainer bar 60 is formed from a substantially elongated thin plate-like material having apertures 62a and 62b at opposite ends thereof which slidingly fit over cross members 42a and 42c. As a result, each retainer bar 60 can be slid along cross members 42a and 42c to any desired position for separating video tapes 56, compact discs 58 and books. In operation, it will be appreciated that if a book, video tape or the like is placed on the rack and leans against retainer bar 60, retainer bar 60 tends to tilt, thereby locking itself in place.

As another alternative, in place of retainer bars 60, retainer rings 64 (see FIGS. 16 and 17) can be provided which are slidable along cross members 42a and 42b for separating video tapes 56, compact discs 58 and books. Rings 64 operate in the same manner as retainer bars 60.

All of the elements described above can be made of a suitable, sturdy plastic material.

It will be appreciated that the present invention can be easily modified within the scope of the present claims herein. Specifically, and referring to FIGS. 11-13, in place of the cruciform-shaped elongated bars 44, elongated bars 144 can be provided in which there are three radially extending legs 146, each equiangularly disposed with respect to each other. In such case, each radially extending leg 146 is formed with a notch 150 similar to notches 50 of elongated bars 44, so as to define securing tabs 152 at the opposite ends of radially extending legs 146. Further, reinforcing arcuate sections 154 are provided to connect adjacent securing tabs 152 together.

In addition, each socket 124 includes a central aperture 126 and three equiangularly arranged slots 128, 129 and 130 extending radially outwardly and in communication with central aperture 126. Each socket 124 is further provided with reduced thickness arcuate walls 132, 133 and 134 which define aperture 126 and are positioned between slots 128, 129 and 130. Of course, as in the first-mentioned embodiment, reduced thickness arcuate walls 132, 133 and 134 have an increasing thickness from their entrance end 138 to their exit end 140.

In operation, elongated bars 144 are positioned in sockets 124 in much the same manner as the first-mentioned embodiment. Specifically, securing tabs 152 are positioned through slots 128, 129 and 130 and then the elongated bar 144 is rotated in the counter-clockwise direction of FIG. 13, that is, from entrance end 138 to exit end 140 of each reduced thickness arcuate wall, whereby an increasing friction fit is provided between each reduced thickness arcuate wall 132, 133 and 134 and the slot 128, 129 and 130 within which it is positioned. In order to prevent over turning and thereby over tightening of each elongated bar 144 in sockets 124, the exit end 140 of each arcuate wall is provided with a "stop" in the form of a raised triangular arrow 136 against which securing tabs 152 abut during their rotation in the counter-clockwise direction, as shown in FIG. 13.

It will be appreciated that other embodiments of the present invention can be provided within the scope of the present invention. For example, although the present invention has been discussed with respect to reduced thickness arcuate walls of each socket that slightly increase in thickness from the entrance end to the exit end thereof, the present invention can be provided with substantially constant thickness arcuate walls 232 having a slight bevel or lead-in area 233, as shown in the partial cross-section of FIG. 19. In such case, once the notch area passes over lead-in area 233, it is frictionally held by constant thickness arcuate wall 232. Still further, the entire thickness of the arcuate walls 332 of each socket can be provided with a constant smaller thickness in which each wall is merely inclined out of the central plane 335 of each plate 20, as shown in the partial cross-section in FIG. 20, that is, with a ramp-like surface. In such case, it is only the inclined nature of the arcuate walls 332 that provides a tightening fit.

Further, while the illustrated embodiments use differently configured left and right end panels 12, 14, the same panel could be used on both sides. That is, two "left" panels 12 could be used, one placed on the left side and the other placed on the right side. The inclined surfaces of the sockets 24 operate also when the end panels are reversed, as described, so that identical end panels are used on both sides. This simplifies manufacture and facilitates assembly because the user need not identify the left and right end panels.

The construction of the present invention is equally usable as a table-type device by using only one end panel (12 or 14) which would be the "top" of the table, and terminating the cross 15 bars 42 short of the opposite panel (which would not exist) so that the terminated cross bars serve as vertical legs. More than three cross bars 42 could be provided, as desired. Also, the device of FIGS. 1 and 2 could be oriented by rotating same 90° and mounting it vertically so that the unit becomes a shelf unit with the end panels being horizontal and serving as shelves. The shape of the end panels would be changed for such use, and preferably four cross bars 42 would be used, two at each end of the "shelf" unit. If intermediate notches are provided along the length of the cross bars of a shelf unit, three (or more) "end panels" could be used to serve as three (or more) respective shelves.

Having described specific preferred embodiments of the invention with reference to the accompanying drawings, it will be appreciated that the present invention is not limited to those precise embodiments, and that various changes and modifications may be effected therein by one of ordinary skill in the art without departing from the scope or spirit of the invention as defined in the appended claims.

What is claimed is:

1. A collapsible rack for holding books, tapes, compact discs and the like, comprising:
   a first end panel having at least two sockets formed therein;
   a second end panel having at least two sockets formed therein;
   each of said first and second end panels having an inner and an outer surface;
   each said socket including an aperture and a slot in communication with said aperture;
   at least two cross members extending between said end panels and engageable with said end panels for securing said end panels together;
   each of said cross members having a first end for insertion through one said aperture of one of said sockets of said first end panel and a second end for insertion through one said aperture of said sockets of said second end panel;
   each end of each said cross member having:
   a securing tab for insertion through one said slot and for engaging said outer surface of said respective end panel when inserted through said slot, and
   limiting and stabilizing surface means for engaging an inner surface of said respective end panel for thereby limiting the extent of travel of said securing tab through said slot and for preventing tilting of said cross member relative to said respective end panel; and said inner and outer surface of each end panel surrounding each aperture having a predetermined thickness such that, upon engagement of said securing tab with said outer surface and engagement of said limiting and stabilizing surface means with said inner surface, rotation of any said cross member in one said aperture results in releasably and non-tiltingly locking siad end of said cross member to said respective end panel with a tightening fit.

2. A collapsible rack according to claim 1, wherein said first end panel has three sockets and said second end panel has three sockets, and there are three said cross members.

3. A collapsible rack according to claim 1, wherein the portion of each end panel surrounding each aperture has an entrance end defined by said slot and a thickness which increases from said entrance end.

4. A collapsible rack according to claim 1, wherein said portion of each panel surrounding each aperture has an entrance end defined by said slot, a substantially constant thickness which provides said tightening fit, and a decreasing beveled section at the entrance end thereof.

5. A collapsible rack according to claim 1, wherein said portion of each panel surrounding each aperture has a substantially constant thickness and said portion is inclined with respect to a plane extending through and defined by each said end panel.

6. A collapsible rack according to claim 1, wherein the portion of each end panel surrounding each aperture has an arcuate configuration.

7. A collapsible rack according to claim 1, wherein each said socket includes a second slot in communication with the aperture thereof.

8. A collapsible rack according to claim 7 wherein said second slot of each socket extends diametrically opposite said first-mentioned slot of said socket.

9. A collapsible rack according to claim 1, wherein each said socket includes second and third slots in communication with the aperture thereof.

10. A collapsible rack according to claim 9, wherein said first-mentioned, second and third slots of each socket are equiangularly positioned about said aperture.

11. A collapsible rack according to claim 1, wherein said slot extends radially outward from said aperture.

12. A collapsible rack according to claim 1, wherein each socket further includes a raised projection on said portion of each end panel surrounding each aperture.

13. A collapsible rack according to claim 12, wherein said raised projection is in the shape of an arrow.

14. A collapsible rack according to claim 1, wherein each said cross member includes an elongated bar formed by a plurality of radially extending legs, at least one of siad legs at each end of said bar having a radial extending slot therein for defining said securing tab and for receiving said portion of each panel surrounding each said aperture.

15. A collapsible rack according to claim 1, wherein each said cross member includes four radially extending legs arranged in a cruciform shape.

16. A collapsible rack according to claim 15, wherein first and diametrical ones of said legs have radial extending slots at opposite ends thereof, and the remaining third and fourth diametrical ones of said legs having reduced dimensions in the radial direction at opposite ends thereof.

17. A collapsible rack according to claim 16, wherein each said socket includes a second slot in communication with the aperture thereof, said second slot of each socket extending diametrically opposite said first-mentioned slot of said socket.

18. A collapsible rack according to claim 14, wherein each said cross member includes three radially extending legs arranged equiangularly with respect to each other.

19. A collapsible rack according to claim 18, wherein each leg includes radial extending slots at opposite ends thereof.

20. A collapsible rack according to claim 18, wherein each said socket includes second and third slots in communication with the aperture thereof, said first- mentioned, second and third slots of each socket being equiangularly positioned about said aperture.

21. A collapsible rack according to claim 1, further including retainer means mounted on at least one said cross member for separating books, tapes, compact discs and the like held on said rack.

22. A collapsible rack according to claim 21, wherein said retainer means includes at least one retainer bar slidably mounted between at least two said cross bars.

23. A collapsible rack according to claim 21, wherein said retainer means includes at least one retainer ring slidably mounted on at least one said cross bar.

24. A collapsible rack according to claim 1, wherein each end panel has an asymmetric parallelogram configuration.

25. A collapsible rack according to claim 1, wherein said limiting and stabilizing surface means includes at least two spaced apart surface portions for bearing against different spaced apart inner surface portions of said respective end panel.

26. A collapsible rack according to claim 1, wherein said limiting and stabilizing surface means includes first surface means for engaging an inner surface of said respective end panel when said securing tab is inserted through one said slot, and second surface means for engaging an inner surface of said respective end panel after said cross member is rotated relative to said end panels for preventing tilting of said cross member relative to said end panel, said end panel being tightly engaged between said second surface and said securing tabs.

* * * * *